US011051286B2

(12) United States Patent
Kim et al.

(10) Patent No.: US 11,051,286 B2
(45) Date of Patent: Jun. 29, 2021

(54) METHOD AND APPARATUS FOR TRANSMITTING AND RECEIVING UPLINK CONTROL INFORMATION ON A PUCCH IN A WIRELESS COMMUNICATION

(71) Applicant: LG ELECTRONICS INC., Seoul (KR)

(72) Inventors: Jaehyung Kim, Seoul (KR); Seonwook Kim, Seoul (KR); Joonkui Ahn, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/858,150

(22) Filed: Apr. 24, 2020

(65) Prior Publication Data
US 2020/0252929 A1 Aug. 6, 2020

Related U.S. Application Data

(63) Continuation of application No. 16/247,199, filed on Jan. 14, 2019, now Pat. No. 10,660,076.
(Continued)

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0026* (2013.01); *H04L 1/1819* (2013.01);
(Continued)

(58) Field of Classification Search
CPC ......... H04W 72/0413; H04W 72/0446; H04W 88/02; H04L 1/0026; H04L 1/1819; H04L 5/0098
See application file for complete search history.

(56) References Cited

U.S. PATENT DOCUMENTS

2013/0114391 A1 5/2013 Jang et al.
2013/0315264 A1 11/2013 Srinivasa et al.
(Continued)

OTHER PUBLICATIONS

Ericsson, "On the Design of Long PUCCH for more than 2 bits," R1-1718636, 3GPP TSG RAN WG1 Meeting#90bis, Prague, Czech Republic, Oct. 9-13, 2017, 21 pages.
(Continued)

*Primary Examiner* — Rhonda L Murphy
(74) *Attorney, Agent, or Firm* — Fish & Richardson P.C.

(57) ABSTRACT

A method for transmitting multiple uplink control information (UCI) on a physical uplink control channel (PUCCH) in a wireless communication system is disclosed. More specifically, the method performed by a user equipment (UE) includes receiving, from a base station, first control information related to the PUCCH for transmitting the multiple UCI; determining a first parameter representing a number of coded bits for the multiple UCI based on the first control information, wherein the multiple UCI includes channel state information (CSI) including at least one of a first part or a second part; determining a size of the first part based on the first parameter and second control information related to
(Continued)

the size determination of the first part; and transmitting, to the base station, the multiple UCI on the PUCCH.

16 Claims, 11 Drawing Sheets

Related U.S. Application Data

(60) Provisional application No. 62/616,465, filed on Jan. 12, 2018.

(51) Int. Cl.
*H04L 1/18* (2006.01)
*H04L 5/00* (2006.01)
*H04W 88/02* (2009.01)

(52) U.S. Cl.
CPC .......... *H04L 1/1864* (2013.01); *H04L 5/0057* (2013.01); *H04L 5/0098* (2013.01); *H04W 72/0446* (2013.01); *H04W 88/02* (2013.01); *H04L 5/0007* (2013.01)

(56) References Cited

U.S. PATENT DOCUMENTS

| 2014/0140281 | A1 | 5/2014 | Choudhury et al. |
| 2016/0014770 | A1 | 1/2016 | Papasakellariou et al. |
| 2018/0176902 | A1 | 6/2018 | Huang et al. |
| 2018/0263021 | A1* | 9/2018 | He .................... H04W 52/325 |
| 2018/0310298 | A1 | 10/2018 | Li et al. |

OTHER PUBLICATIONS

Huawei, HiSilicon, "Remaining issues for CSI reporting," R1-1719425, 3GPP TSG RAN WG1 Meeting #91 Reno, USA, Nov. 27-Dec. 1, 2017, 11 pages.
MediaTek Inc., "Discussion on separate UCI encoding for long-PUCCH," R1-1719571, 3GPP TSG RAN WG1 Meeting 9.1, Reno, USA, Nov. 27-Dec. 1, 2017, 4 pages.
Samsung, "WF for Open Issues on CSI Reporting," R1-1716901, 3GPP TSG-RAN WG1 NR-AH3, Nagoya, Japan, Sep. 18-21, 2017, 19 pages.
Vivo, "Discussion on CSI reporting," R1-1717471, 3GPP TSG RI\N WG1 Meeting #90bis, Prague, CZ, Oct. 9-13, 2017, 7 pages.
Vivo, "Remaining issues on Short-PUCCH for UCI of more than 2 bits," R1-1719786, 3GPP TSG RAN WG1 Meeting 91, Reno, USA, Nov. 27-Dec. 1, 2017, 7 pages.
3gpp.org [online], "3GPP draft; List of RAN1 agreements, Generation Partnership Project (3GPP)," retrieved on Dec. 17, 2017, retrieved from URL <http://www.3gpp.org/ftp/Meetings%5F3GPP%5FSYNC/RAN/Docs/>, 195 pages.
Ericsson, On remaining details of CSI reporting, R1-1718432, 3GPP TSG RAN WG1 Meeting 90bis, Prague, CZ, Oct. 9-13, 2017, 15 pages.
Extended European Search Report in European Appln. No. 19739144.4, dated Dec. 4, 2020, 16 pages.

* cited by examiner

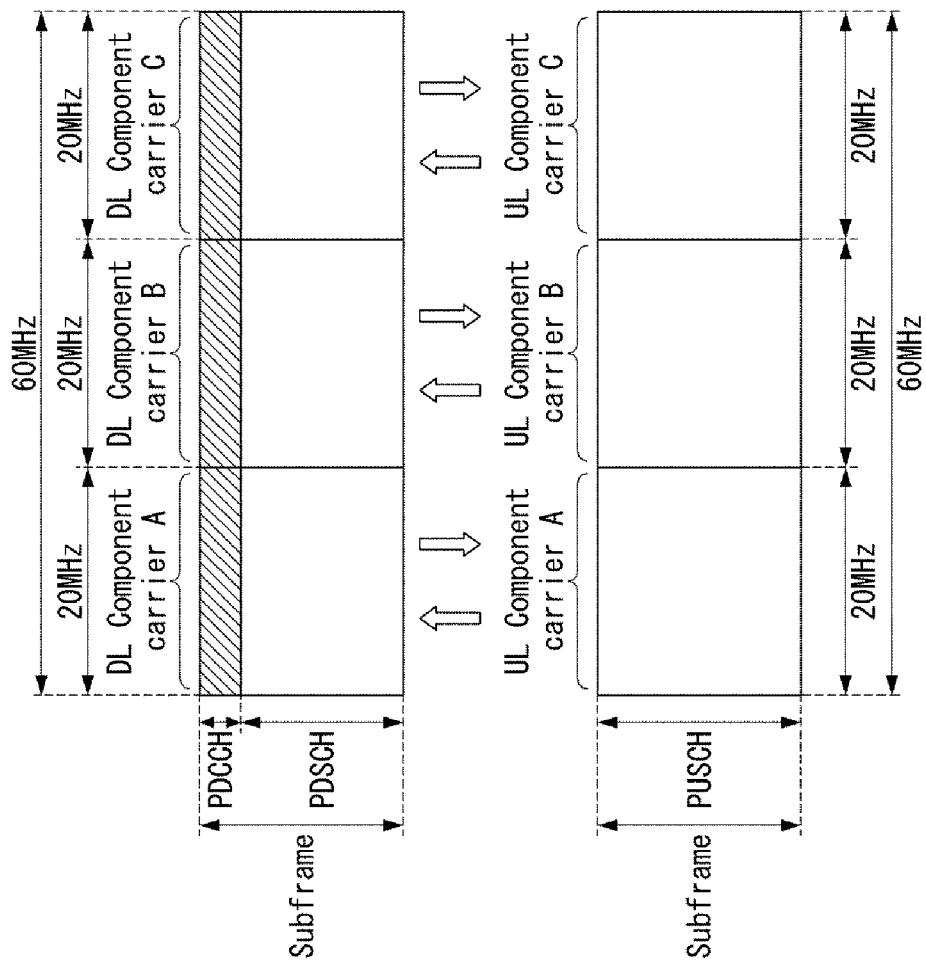
FIG. 6B  Multiple CC
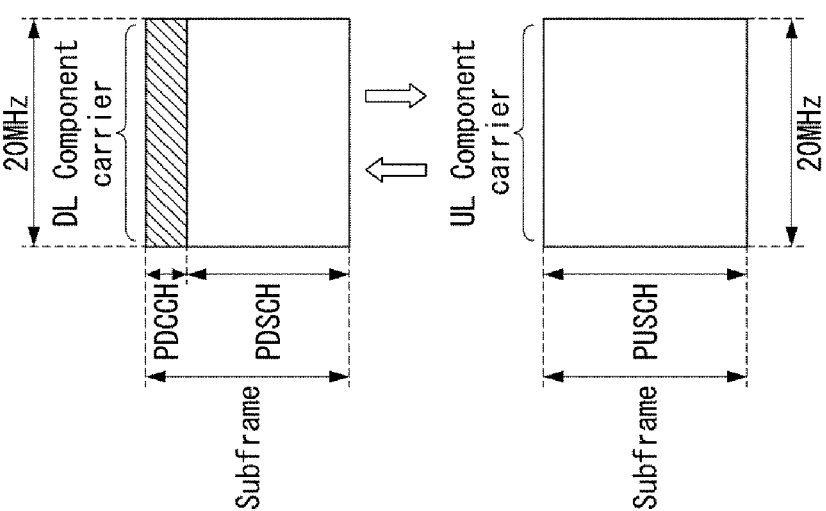
FIG. 6A  Single CC

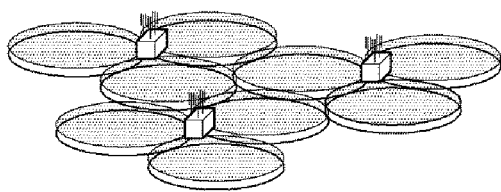
FIG. 7A
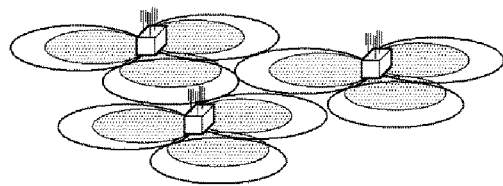
FIG. 7B
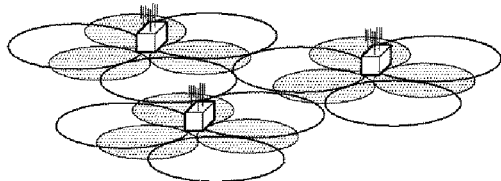
FIG. 7C
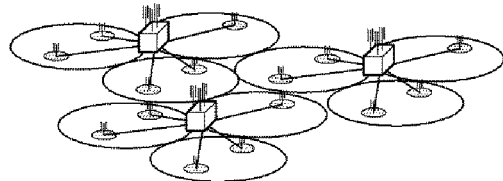
FIG. 7D
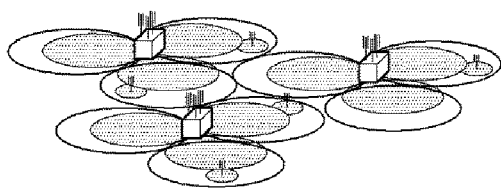
FIG. 7E

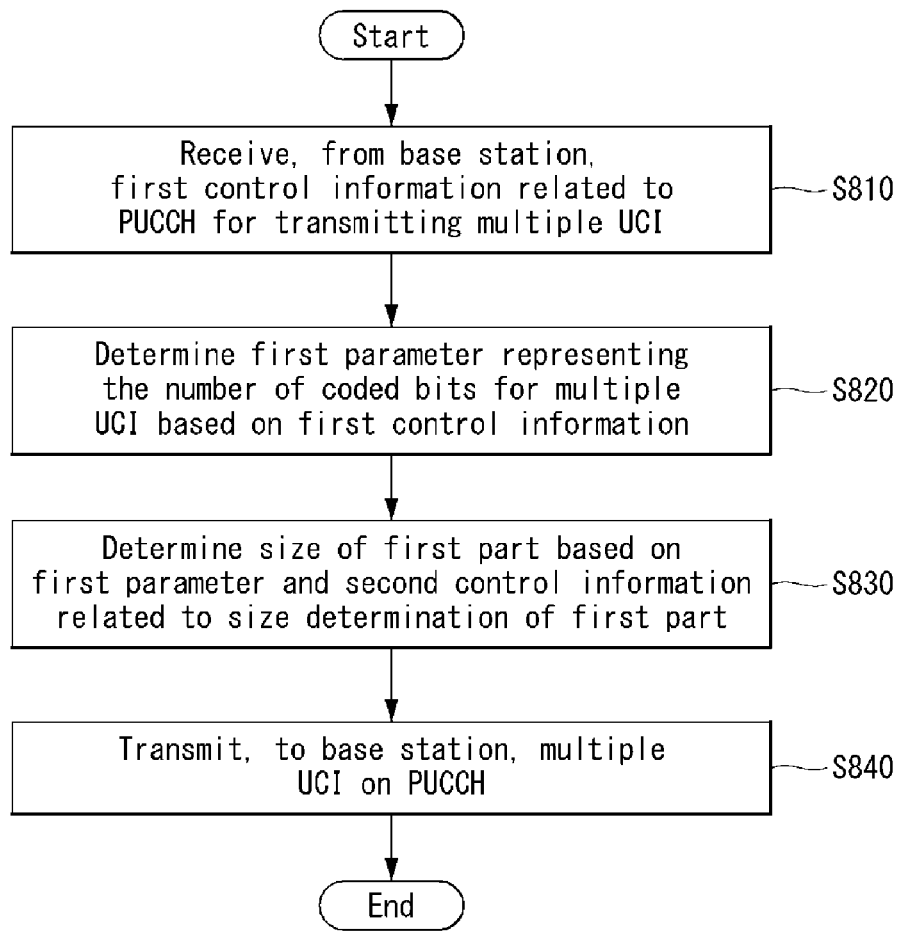

METHOD AND APPARATUS FOR TRANSMITTING AND RECEIVING UPLINK CONTROL INFORMATION ON A PUCCH IN A WIRELESS COMMUNICATION

CROSS-REFERENCE TO RELATED APPLICATIONS

This application claims priority to U.S. application Ser. No. 16/247,199, filed on Jan. 14, 2019, which claims the benefit of U.S. Provisional Application Ser. No. 62/616,465, filed on Jan. 12, 2018, the contents of this aforementioned applications being fully incorporated herein by reference.

BACKGROUND OF THE INVENTION

Field of the Invention

The present invention relates to a wireless communication system, and more particularly to a method for transmitting and receiving uplink control information on a physical uplink control channel (PUCCH) and a device supporting the same.

Description of the Related Art

The present disclosure relates to a wireless communication system and, more particularly, to a method for transmitting and receiving a channel state information (CSI)-reference signal (RS) and an apparatus supporting the same.

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

An object of the present specification is to provide a method for transmitting multiple uplink control information (UCI) on a physical uplink control channel (PUCCH).

Another object of the present specification is to provide a method for determining a size of a specific part of UCI including at least one part.

Another object of the present specification is to provide a method for determining a PUCCH resource to transmit channel state information (CSI) report and the number of resource blocks in the PUCCH resource by assuming the CSI report as a specific tank.

Technical problems to be solved by the present invention are not limited by the above-mentioned technical problems, and other technical problems which are not mentioned above can be clearly understood from the following description by those skilled in the art to which the present invention pertains.

In one aspect, there is provided a method for transmitting, by a user equipment (UE), multiple uplink control information (UCI) on a physical uplink control channel (PUCCH) in a wireless communication system, the method comprising receiving, from a base station, first control information related to the PUCCH for transmitting the multiple UCI; determining a first parameter representing a number of coded bits for the multiple UCI based on the first control information, wherein the multiple UCI includes channel state information (CSI) including at least one of a first part or a second part; determining a size of the first part based on the first parameter and second control information related to the size determination of the first part; and transmitting, to the base station, the multiple UCI on the PUCCH, wherein the second control information includes a second parameter representing the size of the first part, a third parameter representing a configured maximum coding rate, and a fourth parameter representing a modulation order.

In another aspect, there is provided a method for transmitting, by a user equipment (UE), a channel state information (CSI) report on a physical uplink control channel (PUCCH) in a wireless communication system, the method comprising receiving, from a base station, information related to a PUCCH resource for transmitting the CSI report; when CSI including at least one of a first part or a second part includes the second part, determining the PUCCH resource to transmit the CSI report and a number of resource blocks in the PUCCH resource by assuming that the CSI report is a specific rank; and transmitting, to the base station, the CSI report on the PUCCH based on the determination.

When the CSI report is in plural, a PUCCH resource to transmit the plurality of CSI reports and a number of resource blocks in the PUCCH resource are determined by assuming that each CSI report is a specific rank.

In yet another aspect, there is provided a user equipment (UE) for transmitting multiple uplink control information (UCI) on a physical uplink control channel (PUCCH) in a wireless communication system, the UE comprising a radio frequency (RF) module configured to transmit and receive a radio signal; and a processor functionally connected to the RF module, wherein the processor is configured to receive, from a base station, first control information related to the PUCCH for transmitting the multiple UCI; determine a first parameter representing a number of coded bits for the multiple UCI based on the first control information, wherein the multiple UCI includes channel state information (CSI) including at least one of a first part or a second part; determine a size of the first part based on the first parameter and second control information related to the size determination of the first part; and transmit, to the base station, the multiple UCI on the PUCCH, wherein the second control information includes a second parameter representing the size of the first part, a third parameter representing a configured maximum coding rate, and a fourth parameter representing a modulation order.

The present specification has an effect that resources can be efficiently used by defining a method for multiplexing multiple UCI on a PUCCH Effects obtainable from the present invention are not limited by the effects mentioned above, and other effects which are not mentioned above can be clearly understood from the following description by those skilled in the art to which the present invention pertains.

BRIEF DESCRIPTION OF THE DRAWINGS

The accompanying drawings, that are included to provide a further understanding of the invention and are incorporated in and constitute a part of this specification, illustrate embodiments of the invention and together with the description serve to explain various principles of the invention.

FIGS. 6A and 6B illustrate an example of component carriers and carrier aggregation in a wireless communication system to which the present invention is applicable.

FIGS. 7A through 7E illustrate examples of deployment scenarios considering carrier aggregation in an NR system.

FIG. 8 is a flowchart illustrating an operation method of a UE performing a method proposed by the present specification.

DETAILED DESCRIPTION

Figure 1:
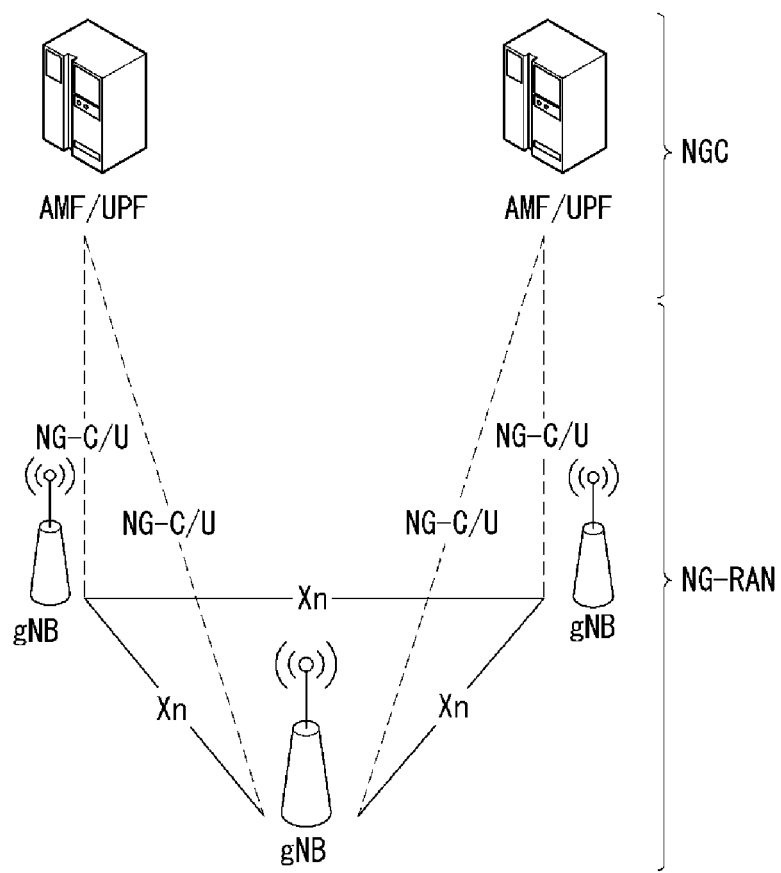
FIG. 1 illustrates an example of an overall structure of a NR system to which a method proposed by the present specification is applicable.

Reference will now be made in detail to embodiments of the invention, examples of which are illustrated in the accompanying drawings. A detailed description to be disclosed below together with the accompanying drawing is to describe exemplary embodiments of the present invention and not to describe a unique embodiment for carrying out the present invention. The detailed description below includes details to provide a complete understanding of the present invention. However, those skilled in the art know that the present invention can be carried out without the details.

In some cases, in order to prevent a concept of the present invention from being ambiguous, known structures and devices may be omitted or illustrated in a block diagram format based on core functions of each structure and device.

In the specification, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (next-generation NB, general NB, gNodeB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present invention, and may be changed to other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present invention can be supported by standard documents disclosed in at least one of IEEE 802, 3GPP, and 3GPP2 which are the wireless access systems. That is, steps or parts in embodiments of the present invention which are not described to clearly show the technical spirit of the present invention can be supported by the standard documents. Further, all terms described in the present disclosure can be described by the standard document.

3GPP LTE/LTE-A/New RAT (NR) is primarily described for clear description, but technical features of the present invention are not limited thereto.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR radio access or new radio.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
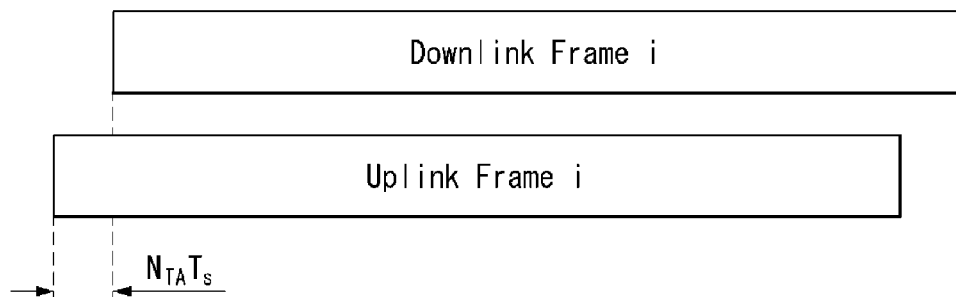
FIG. 2 illustrates a relation between an uplink frame and a downlink frame in a wireless communication system to which a method proposed by the present specification is applicable.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_A=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ frame in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | | | Slot Configuration | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot Configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
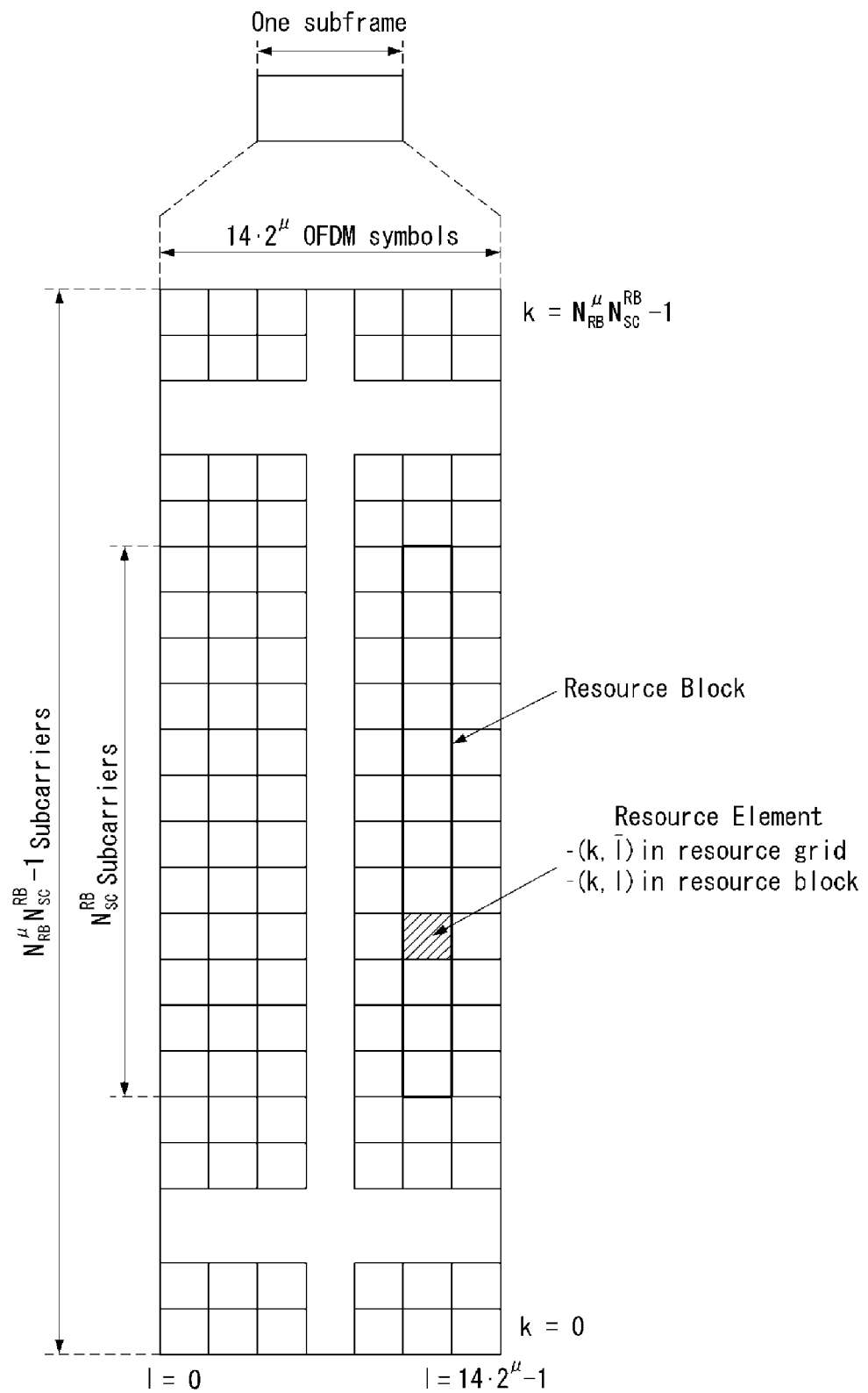
FIG. 3 illustrates an example of a resource grid supported in a wireless communication system to which a method proposed by the present specification is applicable.

FIG. 3 illustrates an example of a resource grid supported in a wireless communication system to which a method proposed by the present specification is applicable.

Referring to FIG. 3, a resource grid consists of $N_{RB}^{\mu}N_{sc}^{RB}$ subcarriers on a frequency domain, each subframe consisting of 14·2μ OFDM symbols, but the present invention is not limited thereto.

In the NR system, a transmitted signal is described by one or more resource grids consisting of $N_{RB}^{\mu}N_{sc}^{RB}$ subcarriers and $2^{\mu}N_{symb}^{(\mu)}$ OFDM symbols, where $N_{RB}^{\mu} \leq N_{RB}^{max,\mu}$. The $N_{RB}^{max,\mu}$ represents a maximum transmission bandwidth and may change not only between numerologies but also between uplink and downlink.

Figure 4:
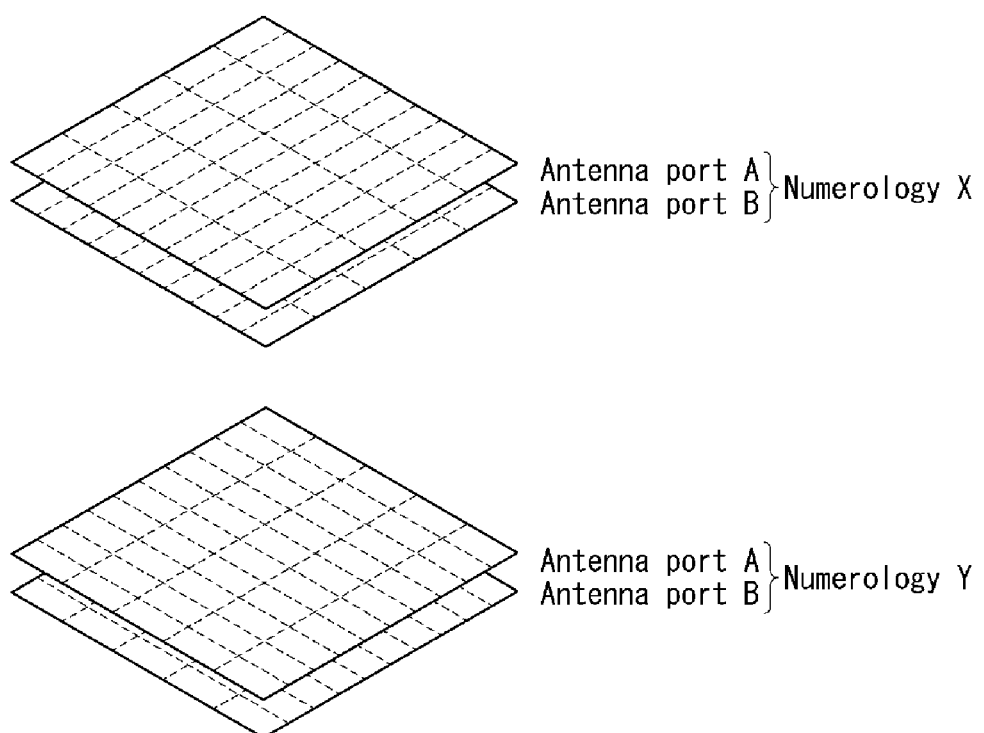
FIG. 4 illustrates examples of a resource grid per antenna port and numerology to which a method proposed by the present specification is applicable.

In this case, as illustrated in FIG. 4, one resource grid may be configured per the numerology μ and an antenna port p.

FIG. 4 illustrates examples of a resource grid per antenna port and numerology to which a method proposed by the present specification is applicable.

Each element of resource grid for the numerology μ and the antenna port p is called a resource element and is uniquely identified by an index pair (k,l̄) where k=0 . . . , $N_{RB}^{\mu}N_{sc}^{RB}$ is an index in a frequency domain, and l=0, . . . , $2^{\mu}N_{symb}^{(\mu)}-1$ refers to a location of a symbol on a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

A physical resource block is defined as $N_{sc}^{RB}=12$ consecutive subcarriers in the frequency domain. On the frequency domain, physical resource blocks are numbered from 0 to $N_{RB}^{\mu}-1$. A relation between a physical resource block number $n_{PRB}$ in the frequency domain and the resource elements (k,l) is given by Equation 1.

$$n_{PRB} = \left\lfloor \frac{k}{N_{sc}^{RB}} \right\rfloor \quad \text{Equation 1}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}-1$ in the frequency domain.

Self-Contained Slot Structure

Figure 5:
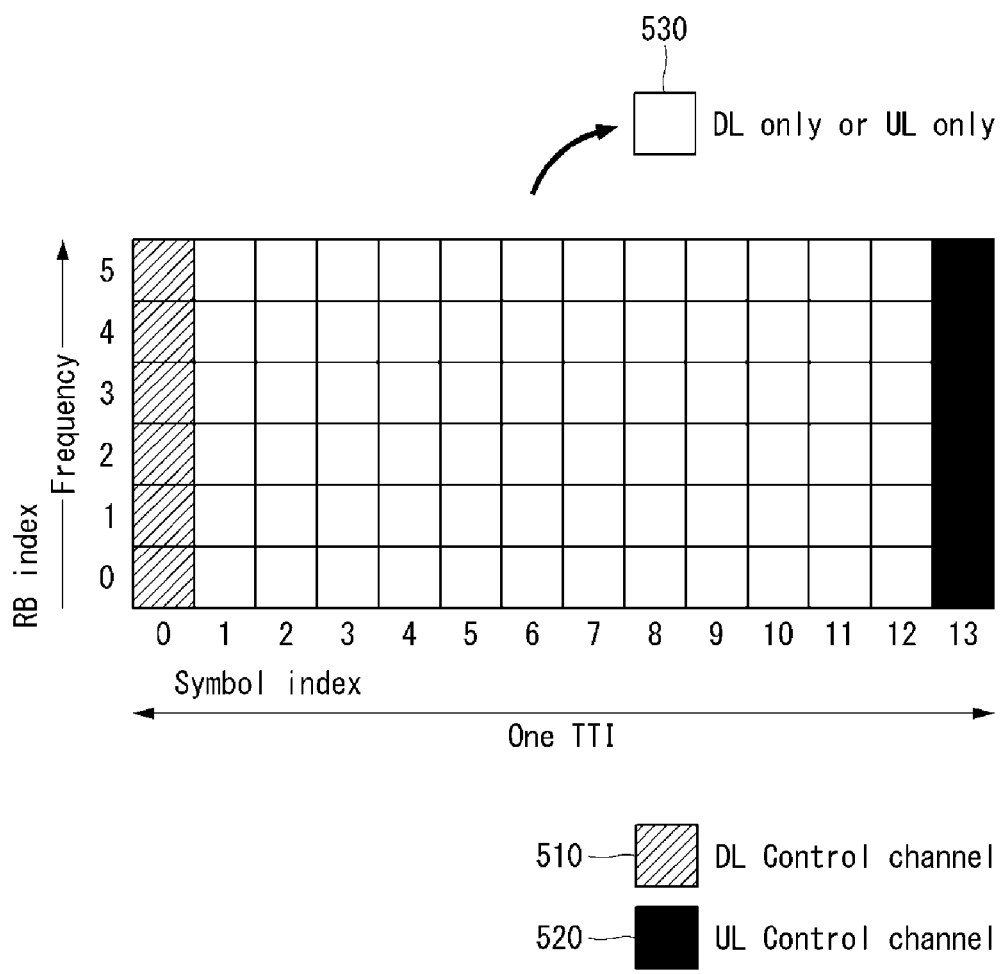
FIG. 5 illustrates an example of a self-contained slot structure to which a method proposed by the present specification is applicable.

To minimize latency of data transmission in a TDD system, 5G new RAT (NR) has considered a self-contained slot structure illustrated in FIG. 5.

That is, FIG. 5 illustrates an example of a self-contained slot structure to which a method proposed by the present specification is applicable.

In FIG. 5, a hatched portion 510 denotes a downlink control region, and a black portion 520 denotes an uplink control region.

A non-marked portion 530 may be used for downlink data transmission or uplink data transmission.

Such a structure may be characterized in that DL transmission and UL transmission are sequentially performed in one slot, DL data is sent in one slot, and UL Ack/Nack is also transmitted and received in one slot.

Such a slot may be defined as a 'self-contained slot'.

That is, through the slot structure, the base station reduces the time it takes to retransmit data to the UE when a data transmission error occurs, and thus can minimize latency of final data delivery.

In the self-contained slot structure, the base station and the UE require a time gap in a process for switching from a transmission mode to a reception mode or a process for switching from the reception mode to the transmission mode.

To this end, in the corresponding slot structure, some OFDM symbols at time of switching from DL to UL are configured as a guard period (GP).

Carrier Aggregation

In embodiments of the present invention, a communication environment to be considered includes all multi-carrier supporting environments. That is, a multi-carrier system or a carrier aggregation (CA) system used in the present invention refers to a system that aggregates and uses one or more component carriers (CCs) with a bandwidth less than a target band when configuring a target wideband, in order to support a wideband.

In the present invention, multi-carrier means aggregation of carriers (or carrier aggregation). In this instance, the aggregation of carriers means both aggregation between continuous carriers and aggregation between non-contiguous carriers. Further, the number of component carriers aggregated between downlink and uplink may be differently set. A case where the number of downlink component carriers (hereinafter referred to as "DL CC") and the number of uplink component carriers (hereinafter, referred to as "UL CC") are the same is referred to as "symmetric aggregation", and a case where the number of downlink component carriers and the number of uplink component carriers are different is referred to as "asymmetric aggregation". The carrier aggregation may be used interchangeably with a term such as bandwidth aggregation or spectrum aggregation.

Carrier aggregation configured by combining two or more component carriers aims at supporting up to a bandwidth of 100 MHz in the LTE-A system. When one or more carriers with a bandwidth smaller than a target band are combined, a bandwidth of the combined carriers may be limited to a bandwidth used in an existing system in order to maintain backward compatibility with the existing IMT system. For example, the existing 3GPP LTE system supports bandwidths of {1.4, 3, 5, 10, 15, 20} MHz, and a 3GPP LTE-advanced (i.e., LTE-A) system may be configured to support a bandwidth greater than 20 MHz by using only the bandwidths for compatibility with the existing system. Further, the carrier aggregation system used in the preset invention may be configured to support the carrier aggregation by defining a new bandwidth regardless of the bandwidth used in the existing system.

The LTE-A system uses a concept of a cell to manage a radio resource.

An environment of the carrier aggregation may be called a multi-cell environment. The cell is defined as a combination of a pair of a downlink resource (DL CC) and an uplink resource (UL CC), but the uplink resource is not essential. Therefore, the cell may consist of only the downlink resource or both the downlink resource and the uplink resource. When a specific UE has only one configured serving cell, the cell may have one DL CC and one UL CC. However, when the specific UE has two or more configured serving cells, the cells have DL CCs as many as the cells and the number of UL CCs may be equal to or less than the number of DL CCs.

Alternatively, on the contrary, the DL CC and the UL CC may be configured. That is, when the specific UE has multiple configured serving cells, a carrier aggregation environment, in which the number of UL CCs is more than the number of DL CCs, may also be supported. That is, the carrier aggregation may be understood as aggregation of two or more cells each having a different carrier frequency (center frequency). The 'cell' described here needs to be distinguished from a 'cell' as a region which is generally used and is covered by the base station.

The cell used in the LTE-A system includes a primary cell (PCell) and a secondary cell (SCell). The PCell and the SCell may be used as a serving cell. In case of the UE which is in an RRC_CONNECTED state, but does not have the configured carrier aggregation or does not support the carrier aggregation, only one serving cell consisting of only the PCell is present. On the other hand, in case of the UE which is in the RRC_CONNECTED state and has the configured carrier aggregation, one or more serving cells may be present and the PCell and one or more SCells are included in all serving cells.

The serving cell (PCell and SCell) may be configured through an RRC parameter. PhysCellId as a physical layer identifier of the cell has integer values of 0 to 503. SCellIndex as a short identifier used to identify the SCell has integer values of 1 to 7. ServCellIndex as a short identifier used to identify the serving cell (PCell and SCell) has the integer values of 0 to 7. The value of 0 is applied to the PCell, and SCellIndex is previously given for application to the SCell. That is, a cell having a smallest cell ID (or cell index) in ServCellIndex is the PCell.

The PCell means a cell that operates on a primary frequency (or primary CC). The PCell may be used for the UE to perform an initial connection establishment process or a connection re-establishment process and may be designated as a cell indicated in a handover process. Further, the PCell means a cell which is the center of control-related communication among serving cells configured in the carrier aggregation environment. That is, the UE may be allocated and transmit a PUCCH only in a PCell of the corresponding UE and use only the PCell to acquire system information or change a monitoring procedure. An evolved universal terrestrial radio access (E-UTRAN) may change only the PCell for the handover procedure to the UE supporting the carrier aggregation environment by using an RRC connection reconfiguration message RRCConnectionReconfigutaion of higher layer including mobile control information mobilityControlInfo.

The SCell may mean a cell that operates on a secondary frequency (or secondary CC). Only one PCell may be allocated to a specific UE, and one or more SCells may be allocated to the specific UE. The SCell may be configured after RRC connection establishment is achieved and used to provide an additional radio resource. The PUCCH is not present in residual cells, i.e., the SCells other than the PCell among the serving cells configured in the carrier aggregation environment. The E-UTRAN may provide all system information related to an operation of a related cell, which is in an RRC_CONNECTED state, through a dedicated signal when adding the SCells to the UE that supports the carrier aggregation environment. A change of the system information may be controlled by releasing and adding the related SCell, and in this case, the RRC connection reconfiguration message "RRCConnectionReconfigutaion" of higher layer may be used. The E-UTRAN may perform dedicated signaling having a different parameter for each UE rather than broadcasting in the related SCell.

After an initial security activation process starts, the E-UTRAN can add the SCells to the initially configured PCell in the connection establishment process to configure a network including one or more SCells. In the carrier aggregation environment, the PCell and the SCell may operate as the respective component carriers. In embodiments described below, a primary component carrier (PCC) may be used as the same meaning as the PCell, and a secondary component carrier (SCC) may be used as the same meaning as the SCell.

FIGS. 6A and 6B illustrate an example of component carriers and carrier aggregation in a wireless communication system to which the present invention is applicable.

FIG. 6A illustrates a single carrier structure used in the LTE system. A component carrier includes a DL CC and an UL CC. One component carrier may have a frequency range of 20 MHz.

FIG. 6B illustrates a carrier aggregation structure used in the LTE-A system. More specifically, FIG. 6B illustrates that three component carriers having a frequency magnitude of 20 MHz are combined. Three DL CCs and three UL CCs are provided, but the number of DL CCs and the number of UL CCs are not limited. In the case of carrier aggregation, the UE may simultaneously monitor three CCs, receive downlink signal/data, and transmit uplink signal/data.

If N DL CCs are managed in a specific cell, the network may allocate M (M≤N) DL CCs to the UE. In this instance, the UE may monitor only M limited DL CCs and receive the DL signal. Further, the network may prioritize L (L≤M≤N) DL CCs and allocate a primary DL CC to the UE. In this case, the UE has to monitor the L DL CCs. Such a scheme may be equally applied to uplink transmission.

A linkage between a carrier frequency (or DL CC) of a downlink resource (or DL CC) and a carrier frequency (or UL CC) of an uplink resource (or UL CC) may be indicated by a higher layer message such as a RRC message or system information. For example, a combination of the DL resource and the UL resource may be configured by a linkage defined by system information block type 2 (SIB2). More specifically, the linkage may mean a mapping relation between the DL CC, on which a PDCCH carrying a UL grant is transmitted, and the UL CC using the UL grant, and mean a mapping relation between the DL CC (or UL CC) on which data for HARQ is transmitted and the UL CC (or DL CC) on which HARQ ACK/NACK signal is transmitted.

If one or more SCells are configured to the UE, the network may activate or deactivate the configured SCell(s). The PCell is always activated. The network activates or deactivates the SCell(s) by sending an activation/deactivation MAC control element.

The activation/deactivation MAC control element has a fixed size and consists of a single octet including seven C-fields and one R-field. The C-field is configured for each SCell index (SCellIndex), and indicates the activation/deactivation state of the SCell. When a value of the C-field is set to '1', it indicates that a SCell having a corresponding SCell index is activated. When a value of the C-field is set to '0', it indicates that a SCell having a corresponding SCell index is deactivated.

Further, the UE maintains a timer sCellDeactivationTimer per configured SCell and deactivates the associated SCell when the timer expires. The same initial timer value is applied to each instance of the timer sCellDeactivationTimer and is configured by RRC signaling. When the SCell(s) are added or after handover, initial SCell(s) are in a deactivation state.

The UE performs the following operation on each of the configured SCell(s) in each TTI.

- If the UE receives an activation/deactivation MAC control element that activates the SCell in a specific TTI (subframe n), the UE activates the SCell in a TTI (subframe n+8 or thereafter) corresponding to predetermined timing and (re)starts a timer related to the corresponding SCell. What the UE activates the SCell means that the UE applies a normal SCell operation, such as sounding reference signal (SRS) transmission on the SCell, channel quality indicator (CQI)/precoding matrix indicator (PMI)/rank indication (RI)/precoding type indicator (PTI) reporting for the SCell, PDCCH monitoring on the SCell, and PDCCH monitoring for the SCell.
- If the UE receives an activation/deactivation MAC control element that deactivates the SCell in a specific TTI (subframe n) or if a timer related to a specific TTI (subframe n)-activated SCell expires, the UE deactivates the SCell in a TTI (subframe n+8 or thereafter) corresponding to predetermined timing, stops the timer of the corresponding SCell, and flushes all of HARQ buffers related to the corresponding SCell.
- If a PDCCH on the activated SCell indicates an uplink grant or a downlink assignment or if a PDCCH on a serving cell scheduling the activated SCell indicates an uplink grant or a downlink assignment for the activated SCell, the UE restarts a timer related to the corresponding SCell.
- If the SCell is deactivated, the UE does not transmit the SRS on the SCell, does not report CQI/PMI/RI/PTI for the SCell, does not transmit UL-SCH on the SCell, and does not monitor the PDCCH on the SCell.

The above-described carrier aggregation has been described based on the LTE/LTE-A system, but it is for convenience of description and can be extended and applied to the 5G NR system in the same or similar manner. In particular, carrier aggregation deployment scenarios that may be considered in the 5G NR system may be the same as FIGS. 7A through 7E.

FIGS. 7A through 7E illustrate examples of deployment scenarios considering carrier aggregation in the NR system.

Referring to FIGS. 7A through 7E, F1 and F2 may respectively mean a cell configured to a first frequency (or a first frequency band, a first carrier frequency, a first center frequency) and a cell configured as a second frequency (or a second frequency band, a second carrier frequency or a second center frequency).

FIG. 7A illustrates a first CA deployment scenario. As illustrated in FIG. 7A, the F1 cell and the F2 cell may be co-located and overlaid. In this case, both the two layers can provide sufficient coverage, and mobility can be supported on the two layers. The first CA deployment scenario may include a case where the F1 cell and the F2 cell are present in the same band. In the first CA deployment scenario, it is expected that aggregation is possible between the overlaid F1 and F2 cells.

FIG. 7B illustrates a second CA deployment scenario. As illustrated in FIG. 7B, the F1 cell and the F2 cell may be co-located and overlaid, but the F2 cell may support smaller coverage due to a larger path loss. In this case, only the F1 cell provides sufficient coverage, and the F2 cell may be used to improve throughput. In this instance, mobility may be performed based on the coverage of the F1 cell. The second CA deployment scenario may include a case where the F1 cell and the F2 cell are present in different bands (e.g., the F1 cell is present in {800 MHz, 2 GHz} and the F2 cell is present in {3.5 GHz}). In the second CA deployment scenario, it is expected that aggregation is possible between the overlaid F1 and F2 cells.

FIG. 7C illustrates a third CA deployment scenario. As illustrated in FIG. 7C, the F1 cell and the F2 cell are co-located and overlaid, but antennas of the F2 cell may be directed to boundaries of the F1 cell so that cell edge throughput is increased. In this case, the F1 cell provides sufficient coverage, but the F2 cell may potentially have holes due to a larger path loss. In this instance, mobility may be performed based on the coverage of the F1 cell. The third CA deployment scenario may include a case where the F1 cell and the F2 cell are present in different bands (e.g., the F1 cell is present in {800 MHz, 2 GHz} and the F2 cell is present in {3.5 GHz}). In the third CA deployment scenario, it is expected that the F1 and F2 cells of the same base station (e.g., eNB) can be aggregated in a region where coverage overlaps.

FIG. 7D illustrates a fourth CA deployment scenario. As illustrated in FIG. 7D, the F1 cell provides macro coverage, and F2 remote radio heads (RRHs) may be used to improve throughput at hot spots. In this instance, mobility may be performed based on the coverage of the F1 cell. The fourth CA deployment scenario may include both a case where the F1 cell and the F2 cell correspond to DL non-contiguous carriers on the same band (e.g., 1.7 GHz) and a case where the F1 cell and the F2 cell are present on different bands (e.g., the F1 cell is present in {800 MHz, 2 GHz} and the F2 cell is present in {3.5 GHz}). In the fourth CA deployment scenario, it is expected that the F2 cells (i.e., RRHs) can be aggregated with the F1 cell(s) (i.e., macro cell(s)) underlying the F2 cells.

FIG. 7E illustrates a fifth CA deployment scenario. The fifth CA deployment scenario is similar to the second CA deployment scenario, but frequency selective repeaters may be deployed so that coverage can be extended for one of the carrier frequencies. In the fifth CA deployment scenario, it is expected that the F1 and F2 cells of the same base station can be aggregated in a region where coverage overlaps.

A reception timing difference at the physical layer of UL grants and DL assignments for the same TTI (e.g., depending on the number of control symbols, propagation and deployment scenario) although it is caused by different serving cells may not affect a MAC operation. The UE may need to cope with a relative propagation delay difference of up to 30 us among the CCs to be aggregated in both intra-band non-contiguous CA and inter-band non-contiguous CS. This may mean that the UE needs to cope with a delay spread of up to 30.26 us among the CCs monitored at a receiver because a time alignment of the base station is specified to be up to 0.26 us. This may also mean that the UE have to cope with a maximum uplink transmission timing difference between TAGs of 32.47 us for inter-band CA with multiple TAGs.

When the CA is deployed, frame timing and a system frame number (SFN) may be aligned across aggregated cells.

A method for supporting multiple uplink control information (UCI) on long PUCCH proposed by the present specification is described below with reference to related drawings.

The NR system can support a physical uplink control channel (PUCCH) that is a physical channel for transmitting UCI including information, such as hybrid automatic repeat request (HARQ)-acknowledgement (ACK), a scheduling request (SR), channel state information (CSI).

In embodiments, the PUCCH may include a small-payload PUCCH supporting small UCI payload (e.g., 1-2-bit UCI) and a large-payload PUCCH supporting large UCI payload (e.g., more than 2 bits and up to hundreds of bits) depending on UCI payload.

The small-payload PUCCH and the large-payload PUCCH each may include a short PUCCH with a short duration (e.g., 1-2-symbol duration) and a long PUCCH with a long duration (e.g., 4-14-symbol duration).

In embodiments, the long PUCCH has to transmit mainly medium/large UCI payload or may be used to improve coverage of the small UCI payload.

When it is required to additionally expand coverage compared to the long PUCCH, a multi-slot long PUCCH in which the same UCI information is transmitted over multiple slots can be supported.

For example, if coverage cannot be secured in a given UCI payload and a code rate, the UE can secure the coverage through a gain resulting from repeated transmission using the multi-slot long PUCCH.

The medium/large UCI payload transmitted on the long PUCCH may consist of one or multiple combinations among the above UCI (e.g., HARQ-ACK, SR, CSI, etc.).

The above case will be represented as 'multiple UCI on long PUCCH' for convenience of explanation.

That is, the present specification proposes an operation supporting the multiple UCI on long PUCCH.

In embodiments, examples of multiple UCI simultaneously transmitted on the long PUCCH may include simultaneous transmission of HARQ-ACK (or HARQ-ACK and SR) and CSI.

Detailed contents for supporting the multiple UCI on long PUCCH proposed by the present specification are described in detail below.

UCI partitioning for supporting multiple UCI on long PUCCH

First, UCI partitioning for supporting multiple UCI on long PUCCH is described.

If multiple UCI payloads include CSI report, the payload may be variable by the number of ranks decided by a terminal (e.g., UE).

In this case, in order to avoid blind detection (BD) at a base station (e.g., next generation Node B (gNB)), the UE may transmit directly or indirectly, to the gNB, information (e.g., rank information, etc.) capable of determining a UCI payload size.

As one of the methods, the UE divides total variable-size UCI into part 1 UCI that is a fixed part and part 2 UCI that is a variable part and separately encodes it.

In embodiments, the part 1 UCI and the part 2 UCI may be represented by a first UCI part and a second UCI part, respectively.

Further, after the UE causes rank information, etc. capable of determining a size of the part 2 UCI to be included in fixed-size part 1 UCI and encodes it, the UE can transmit it.

UCI to RE mapping for support of multiple UCI on long PUCCH

Next, UCI to resource element (RE) mapping for supporting multiple UCI on long PUCCH is described below.

If CSI for PUCCH transmission of variable-size CSI report described above is configured to be partitioned into fixed size part 1 CSI and variable-size part 2 CSI, the gNB can grasp a payload size of the part 2 CSI only when successfully decoding the part 1 CSI, and attempt the decoding based on this.

Thus, it can be said that the part 1 CSI has priority over the part 2 CSI in terms of decoding order and performance.

Accordingly, when multiple UCI payloads are configured to support the multiple UCI on long PUCCH, HARQ-ACK (or HARQ-ACK and SR) information with high importance together with the part 1 CSI may configure part 1 UCI and may be jointly encoded, and part 2 UCI may consist of only the part 2 CSI and may be separately encoded.

For reason of the performance priority or the like described above, RE mapping may be performed on the part 1 UCI so that the part 1 UCI is preferentially as close as possible to PUCCH demodulation reference signal (DMRS).

After the RE mapping of the part 1 UCI through the above method, RE mapping of the part 2 UCI may be performed in a remaining PUCCH region.

The RE mapping operation described above may be performed by the UE, and may be performed by the gNB when UCI can be interpreted as downlink control information (DCI).

Here, a basic unit of the RE mapping operation is a modulation symbol.

Thus, in order to faithfully support a RE mapping method by separating the part 1 UCI and the part 2 UCI, part 1 and part 2 UCI coded bits have to be separated on a per modulation symbol basis.

To this end, the part 1 UCI coded bits and/or the part 2 UCI coded bits for supporting the multiple UCI on long PUCCH may be partitioned to be divided by a multiple of modulation order Qm.

As a method for producing the part 1 UCI coded bit so that the part 1 UCI coded bit is the multiple of the Qm, the following method may be considered.

A maximum code rate Rmax which is allowed per PUCCH format may be previously configured to the UE via higher layer signaling, and the UE may apply a code rate less than the maximum code rate Rmax upon actual UCI transmission.

In this instance, when a size $N\_p1/Rmax$ of the part 1 UCI coded bits calculated considering part 1 UCI payload size $N\_p1$ and Rmax is not the multiple of the Qm, i.e., when (N_p1/Rmax) mod Qm≠0, rate matching may be performed so that the size N_p1/Rmax is the multiple of the Qm.

The rate matching means an output operation performed so that a bit size of the part 1 UCI coded bit is the multiple of the Qm when a channel coding output buffer (e.g., circular buffer) outputs the part 1 UCI coded bit.

In addition to the rate matching operation mentioned above, a final output may be the multiple of the Qm by performing circular repetition in a part 1 UCI coded bit sequence generated based on the N_p1/Rmax, or repeating a last portion of the part 1 UCI coded bit sequence, or padding '0', '1', or a random number.

Alternatively, some (e.g., initial bit(s) of the part 2 UCI coded bits) of the part 2 UCI coded bits may be used as padding bit(s).

In the same manner as the part 1 UCI coded bits, the Part 2 UCI coded bits may be configured to be the multiple of the Qm through the same method. The above method may be performed by the following steps ((1) to (4)) which are performed by the UE.

(1) The UE calculates the total number $N_t$ of UCI coded bits that can be transmitted to PUCCH from configured PUCCH resource parameters by the following Equation 2.

$$N_t = N_{sym} \times N_{RB} \times N_{SC} \times Q_m \quad \text{Equation 2}$$

In Equation 2, $N_{sym}$ is the number of transmittable PUCCH symbols of configured UCI, $N_{RB}$ is the number of configured PUCCH RBs, $N_{SC}$ is the number of subcarriers in 1 RB (e.g., $N_{SC}$=12), and Qm is modulation order (e.g., 2 for QPSK).

(2) The UE determines part 1 UCI coded bit size N_c1 within range not exceeding $N_t$ from the Part 1 UCI payload and the Rmax by the following Equation 3 (N_c1 is configured to be the multiple of the Qm).

$$N\_c1 = \min(N_t, \lceil N\_p1/R_{max}/Q_m \rceil \times Q_m) \quad \text{Equation 3}$$

In Equation 3, N_p1 means part 1 UCI payload size, $R_{max}$ means a configured maximum code rate, and ⌈ ⌉ means a ceiling operation.

(3) The UE determines part 2 UCI coded bit size N_c2 from $N_t$ and N_c1 by the following Equation 4.

$$N\_c2 = N_t - N\_c1 \quad \text{Equation 4}$$

(4) The UE individually generates the part 1 UCI coded bits and the part 2 UCI coded bits in conformity with N_c1 and N_c2 using the method (rate mating, padding, etc.) for generating the part 1 UCI coded bits so that the part 1 UCI coded bits are the multiple of the $Q_m$, and then performs the RE mapping via modulation (e.g., QPSK modulation).

Method for determining resources for support of multiple UCI on long PUCCH

Next, a method for determining resources for supporting multiple UCI on long PUCCH is described below.

For a method for determining resources when simultaneously transmitting multiple UCI (e.g., HARQ-ACK (or HARQ-ACK and SR) and CSI), the following two cases (Case 1 and Case 2) may be considered.

For the two cases to be described below, a maximum code rate Rmax which is allowed per PUCCH format may be previously configured to the UE via higher layer signaling, and the UE may apply a code rate R less than the Rmax upon actual UCI transmission.

(Case 1): A case where multiple UCI is transmitted on large-payload long PUCCH configured for HARQ-ACK (i.e., a case where HARQ-ACK resource is indicated via DCI)

In the Case 1, after multiple PUCCH resource sets are previously configured to the UE via the higher layer signaling, the UE may select one of the multiple PUCCH resource sets depending on total UCI payload size N_p.

The selected PUCCH resource set may again consist of multiple PUCCH resources.

In the Case 1, the PUCCH resources in the PUCCH resource set may be indicated by a HARQ-ACK resource indicator in a DCI field for scheduling a PDSCH corresponding to corresponding HARQ-ACK bit.

When there are a large number of PUCCH resources in the PUCCH resource set, the PUCCH resources in the PUCCH resource set may be indicated using an implicit indication method or a combination of DCI and implicit indication to reduce a DCI overhead.

For example, the implicit indication method may a value determined by a CCE index of PDSCH scheduling DCI.

The number of RBs that are used for the UE to transmit the multiple UCI on long PUCCH may be determined by the total UCI payload size N_p and the maximum code rate Rmax.

The value thus determined may be different from the number of RBs allocated through the PUCCH resource.

(Case 2): A case where multiple UCI is transmitted on large-payload long PUCCH configured for CSI report (i.e., a case where HARQ-ACK resource cannot be indicated via DCI)

In the Case 2, after multiple PUCCH resources for the CSI report are previously configured to the UE via the higher layer signaling, the UE may select one of the multiple PUCCH resources by a combination of the total UCI payload size N_p and the maximum code rate Rmax.

For example, assuming that the number of REs on which PUCCH transmission allocated at PUCCH resource i is possible is $N_{RE,i}$, the UE may select PUCCH resources corresponding to a minimum value $N_{RE,i,min}$ among $N_{RE,i}$ value(s) satisfying $N_{RE,i} \geq N\_p/Rmax/Qm$.

In this instance, in the same manner as (Case 1), the number of RBs that are used for the UE to actually transmit UCI may be determined by N_p and Rmax, and the value thus determined may be different from the number of RBs allocated through the PUCCH resource.

In case that the Part 2 CSI is variable-size, if the UE determines the PUCCH resource or the PUCCH resource set based on N_p as in the above method and does not inform explicitly or implicitly the gNB of N_p information, the gNB may have to reserve excessive PUCCH resources taking account of the variable-size of the Part 2 CSI, or perform excessive BD for PUCCH resource and/or PUCCH resource set for several N_p possibilities.

In the present specification, 'A and/or B' may be interpreted in the same sense as 'including at least one of A or B'.

This has a problem that the whole resource overhead and computational complexity and decoding time at the gNB are increased.

First, in the (case 1), due to uncertainty of N_p, the gNB assumes multiple PUCCH resource sets and has to attempt the decoding using a HARQ-ACK resource indicator of DCI.

Even if the gNB uses the HARQ-ACK resource indicator via the DCI, the gNB assumes several RB sizes and has to attempt fixed-size part 1 UCI decoding since the N_p is still uncertain from the gNB perspective.

Assuming that there is a large difference between the number of RBs allocated at PUCCH resource and the number of RBs used for the actual UCI transmission, the number of times of BD may excessively increase.

In the (case 2), due to uncertainty of N_p, the gNB assumes several N_p values for the multiple PUCCH resources configured via the higher layer signaling and has to perform the BD for the fixed-size part 1 UCI decoding.

The following methods may be considered to solve or mitigate the above-mentioned problem.

(Method 1): A case where multiple UCI is transmitted on large-payload long PUCCH configured for HARQ-ACK (i.e., a case where HARQ-ACK resource is indicated via DCI)

A) Method for Determining PUCCH Resource Set (Method 1-A-1) The UE determines a PUCCH resource set based on fixed-size part 1 UCI (or part 1 CSI), or fixed-size part 1 UCI (or part 1 CSI) and Rmax.

(Method 1-A-2) The UE determines a PUCCH resource set based on fixed-size part 1 UCI (or part 1 CSI) and fixed-size 'reference' part 2 UCI (or 'reference' part 2 CSI), or fixed-size part 1 UCI (or part 1 CSI), fixed-size 'reference' part 2 UCI (or 'reference' part 2 CSI), and Rmax.

The reference part 2 UCI (or reference part 2 CSI) is a reference value for determining a kind of PUCCH resource set, a PUCCH resource, or the number of RBs used in actual UCI transmission in the PUCCH resource that can be configured in a range of a minimum value (e.g., 0) and a maximum value the part 2 UCI (or part 2 CSI) can have in consideration of variable-size part 2 UCI (or part 2 CSI).

A reference part 2 UCI (or reference part 2 CSI) value may be a value assuming that rank=1, or a minimum value or a maximum value that the part 2 UCI (or part 2 CSI) can have.

The reference part 2 UCI (or reference part 2 CSI) value may be a fixed value described in the standard document, or a value configured via RRC signaling or a combination of RRC signaling and DCI.

The meaning that it is based on the reference part 2 UCI (or reference part 2 CSI) includes both a case where a value configured considering the part 2 UCI (or part 2 CSI) is linearly added to the fixed-size part 1 UCI (or part 1 CSI), and a case where the value configured considering the part 2 UCI (or part 2 CSI) is multiplied in the scaled form.

B) Method for Determining the Number of RBs Used in Actual UCI Transmission in PUCCH Resource (Method 1-B-1) The UE determines a RB to transmit actual UCI in a PUCCH resource based on fixed-size part 1 UCI (or part 1 CSI) and Rmax.

(Method 1-B-2) The UE determines a RB to transmit actual UCI in a PUCCH resource based on fixed-size part 1 UCI (or part 1 CSI), fixed-size 'reference' part 2 UCI (or 'reference' part 2 CSI), and Rmax.

The reference part 2 UCI (or reference part 2 CSI) is a reference value for determining a kind of PUCCH resource set, a PUCCH resource, or the number of RBs used in actual UCI transmission in the PUCCH resource that can be configured in a range of a minimum value (e.g., 0) and a maximum value the part 2 UCI (or part 2 CSI) can have in consideration of variable-size part 2 UCI (or part 2 CSI).

A reference part 2 UCI (or reference part 2 CSI) value may be a value assuming that rank=1, or a minimum value or a maximum value that the part 2 UCI (or part 2 CSI) can have.

The reference part 2 UCI (or reference part 2 CSI) value may be a fixed value described in the standard document, or a value configured via RRC (signaling) or a combination of RRC (signaling) and DCI.

The meaning that it is based on the reference part 2 UCI (or reference part 2 CSI) includes both a case where a value configured considering the part 2 UCI (or part 2 CSI) is linearly added to the fixed-size part 1 UCI (or part 1 CSI), and a case where the value configured considering the part 2 UCI (or part 2 CSI) is multiplied in the scaled form.

(Method 1-B-3) The UE determines a RB to transmit actual UCI in a PUCCH resource based on the total number of bits adding maximum values of fixed-size part 1 UCI (or part 1 CSI) and variable-size part 2 UCI (or variable-size part 2 CSI), or based on a maximum value of total UCI (part 1+part 2) payload size and Rmax.

Further, the gNB may be blind detected by assuming the above methods.

(Method 2): A case where multiple UCI is transmitted on large-payload long PUCCH configured for CSI report (i.e., a case where HARQ-ACK resource cannot be indicated via DCI)

Method for Determining PUCCH Resource

Method 2-A-1) The UE determines a PUCCH resource based on fixed-size part 1 UCI (or part 1 CSI), or the fixed-size part 1 UCI (or part 1 CSI) and Rmax.

Method 2-A-2) The UE determines a PUCCH resource based on fixed-size part 1 UCI (or part 1 CSI) and fixed-size 'reference' part 2 UCI (or 'reference' part 2 CSI), or fixed-size part 1 UCI (or part 1 CSI), fixed-size 'reference' part 2 UCI (or 'reference' part 2 CSI), and Rmax.

The reference part 2 UCI (or reference part 2 CSI) is a reference value for determining a kind of PUCCH resource set, a PUCCH resource, or the number of RBs used in actual UCI transmission in the PUCCH resource that can be configured in a range of a minimum value (e.g., 0) and a maximum value the part 2 UCI (or part 2 CSI) can have in consideration of variable-size part 2 UCI (or part 2 CSI).

A reference part 2 UCI (or reference part 2 CSI) value may be a value assuming that rank=1, or a minimum value or a maximum value that the part 2 UCI (or part 2 CSI) can have.

The reference part 2 UCI (or reference part 2 CSI) value may be a fixed value described in the standard document, or a value configured via RRC (signaling) or a combination of RRC (signaling) and DCI.

The meaning that it is based on the reference part 2 UCI (or reference part 2 CSI) includes both a case where a value configured considering the part 2 UCI (or part 2 CSI) is linearly added to the fixed-size part 1 UCI (or part 1 CSI), and a case where the value configured considering the part 2 UCI (or part 2 CSI) is multiplied in the scaled form.

Method for Determining the Number of RBs Used in Actual UCI Transmission in PUCCH Resource Method 2-B-1) The UE determines a RB to transmit actual UCI in a PUCCH resource based on fixed-size part 1 UCI (or part 1 CSI) and Rmax.

Method 2-B-2) The UE determines a RB to transmit actual UCI in a PUCCH resource based on fixed-size part 1 UCI (or part 1 CSI), fixed-size 'reference' part 2 UCI (or 'reference' part 2 CSI), and Rmax.

The reference part 2 UCI (or reference part 2 CSI) is a reference value for determining a kind of PUCCH resource set, a PUCCH resource, or the number of RBs used in actual UCI transmission in the PUCCH resource that can be configured in a range of a minimum value (e.g., 0) and a maximum value the part 2 UCI (or part 2 CSI) can have in consideration of variable-size part 2 UCI (or part 2 CSI).

A reference part 2 UCI (or reference part 2 CSI) value may be a value assuming that rank=1, or a minimum value or a maximum value that the part 2 UCI (or part 2 CSI) can have.

The reference part 2 UCI (or reference part 2 CSI) value may be a fixed value described in the standard document, or a value configured via RRC (signaling) or a combination of RRC (signaling) and DCI.

The meaning that it is based on the reference part 2 UCI (or reference part 2 CSI) includes both a case where a value configured considering the part 2 UCI (or part 2 CSI) is linearly added to the fixed-size part 1 UCI (or part 1 CSI), and a case where the value configured considering the part 2 UCI (or part 2 CSI) is multiplied in the scaled form.

Method 2-B-3) The UE determines a RB to transmit actual UCI in a PUCCH resource based on the total number of bits adding maximum values of fixed-size part 1 UCI (or part 1 CSI) and variable-size part 2 UCI (or variable-size part 2 CSI), or based on a maximum value of total UCI (part 1+part 2) payload size and Rmax.

Further, the gNB may be blind detected by assuming the above methods.

In the methods mentioned above, "fixed-size part 1 UCI (or part 1 CSI) and fixed-size 'reference' part 2 UCI (or 'reference' part 2 CSI)" may mean "the total number of bits adding fixed-size part 1 UCI (or part 1 CSI) and fixed-size 'reference' part 2 UCI (or 'reference' part 2 CSI) or total payload size".

In addition, in the methods mentioned above, more specifically, "PUCCH resource (set) or RB is determined based on UCI (or CSI) and Rmax" may mean that "determining resource (set) or RB consisting of a minimum number of REs capable of transmitting the number of coded bits based on UCI (or CSI) and Rmax".

In the above methods, the part 1 UCI may include HARQ-ACK and/or SR.

In the above methods, in case of HARQ-ACK PUCCH resource set, a RB to transmit actual UCI may be configured per UCI payload size range.

The respective embodiments or the respective methods mentioned above may be separately performed, and methods proposed by the present specification can be implemented through a combination of one or more embodiments or a combination of one or more methods.

FIG. 8 is a flowchart illustrating an operation method of a UE performing a method proposed by the present specification.

More specifically, FIG. 8 illustrates an operation method of a UE for transmitting multiple UCI on a PUCCH in a wireless communication system.

First, the UE receives, from a base station, first control information related to the PUCCH for transmitting the multiple UCI in S810.

The UE determines a first parameter representing the number of coded bits for the multiple UCI based on the first control information in S820.

The first control information may include information about the number of symbols of the PUCCH and information about the number of resource blocks of the PUCCH.

In embodiments, the multiple UCI includes channel state information (CSI) including at least one of a first part or a second part.

The UE determines a size of the first part based on the first parameter and second control information related to the size determination of the first part in S830.

The UE transmits, to the base station, the multiple UCI on the PUCCH in S840.

The second control information may include a second parameter representing the size of the first part, a third parameter representing a configured maximum coding rate, and a fourth parameter representing a modulation order.

A detailed method for determining the size of the first part refers to Equations 2 to 4 mentioned above and the description related to Equations 2 to 4. The method may be summarized as follows.

The size of the first part is determined as a minimum value among the first parameter and the second control information.

More specifically, the size of the first part may be determined by $\min(N_f, \lceil \text{second parameter} \div \text{third parameter} \div \text{fourth parameter} \rceil \times \text{fourth parameter})$.

The second control information may be determined based on a value obtained by dividing the second parameter by each of the third parameter and the fourth parameter, and more specifically may be determined by $(\lceil \text{second parameter} \div \text{third parameter} \div \text{fourth parameter} \rceil \times \text{fourth parameter})$.

Figure 9:
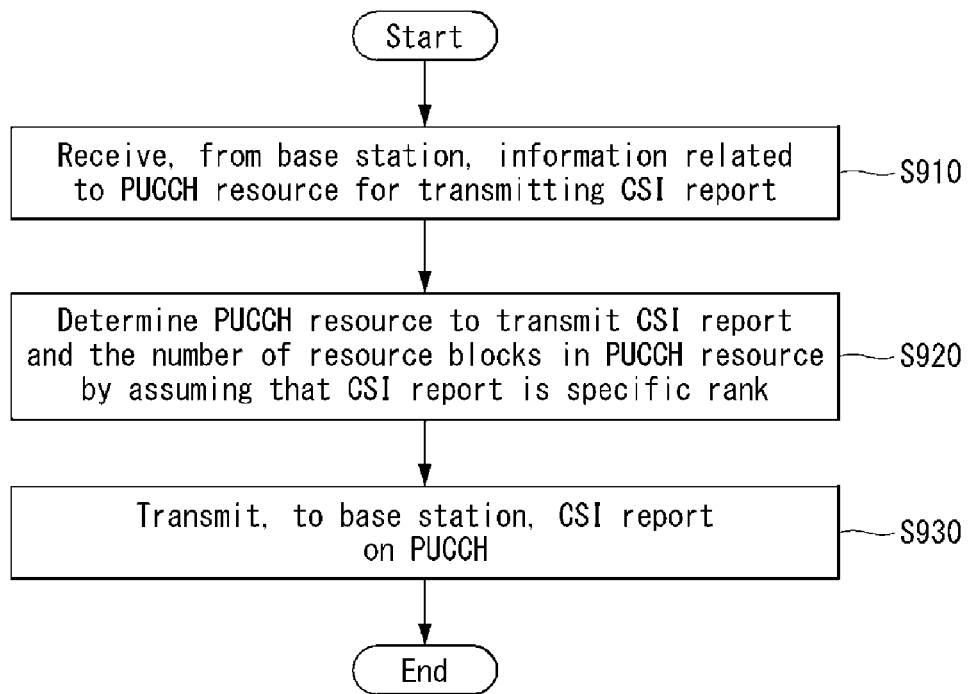
FIG. 9 is a flowchart illustrating another operation method of a UE performing a method proposed by the present specification.

FIG. 9 is a flowchart illustrating another operation method of a UE performing a method proposed by the present specification.

More specifically, FIG. 9 illustrates an operation method of a UE for transmitting channel state information (CSI) report on a PUCCH in a wireless communication system.

First, the UE receives, from a base station, information related to a PUCCH resource for transmitting the CSI report in S910.

When CSI including at least one of a first part or a second part includes the second part, the UE determines the PUCCH resource to transmit the CSI report and the number of resource blocks in the PUCCH resource by assuming that the CSI report is a specific rank in S920.

The UE transmits, to the base station, the CSI report on the PUCCH in S930.

In embodiments, when the CSI report is in plural, a PUCCH resource to transmit the plurality of CSI reports and the number of resource blocks in the PUCCH resource may be determined by assuming that each CSI report is a specific rank.

The specific rank may be rank-1.

Overview of Device to which the Present Invention is Applicable

Figure 10:
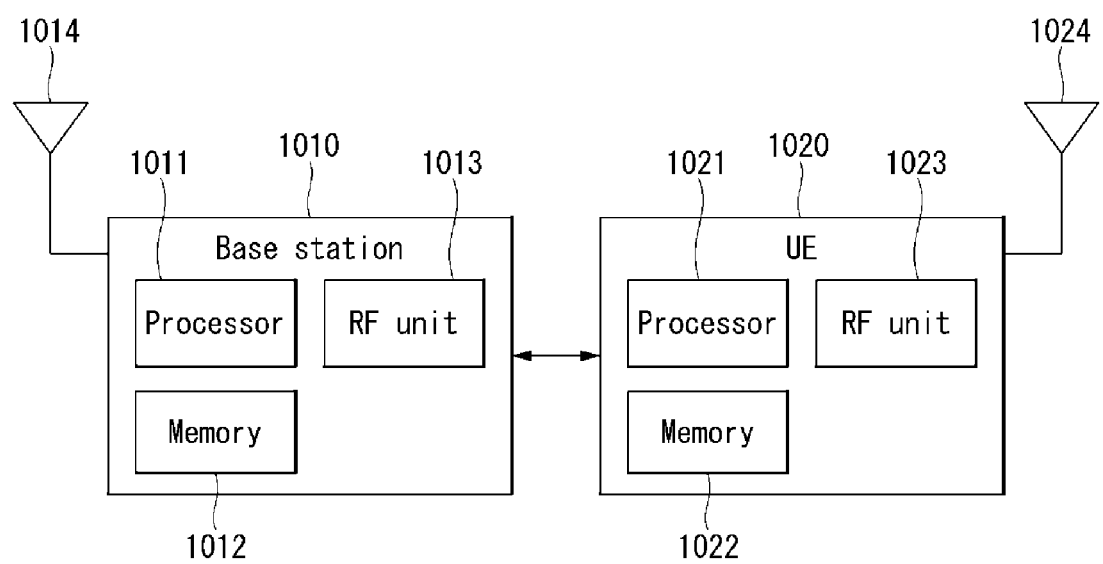
FIG. 10 illustrates an example of a block configuration diagram of a wireless communication device to which methods proposed by the present specification are applicable.

FIG. 10 illustrates an example of a block configuration diagram of a wireless communication device to which methods proposed by the present specification are applicable.

Referring to FIG. 10, a wireless communication system includes a base station 1010 and multiple UEs 1020 positioned in a region of the base station.

Each of the base station 1010 and the UE 1020 may be represented by a radio device.

The base station 1010 includes a processor 1011, a memory 1012, and a radio frequency (RF) module 1013. The processor 1011 implements functions, processes, and/or methods proposed in FIGS. 1 to 9. Layers of radio interface protocol may be implemented by the processor. The memory 1012 is connected to the processor 1011 and stores various types of information for driving the processor 1011. The RF module 1013 is connected to the processor 1011 and transmits and/or receives radio signals.

The UE 1020 includes a processor 1021, a memory 1022, and a RF module 1023.

The processor 1021 implements functions, processes, and/or methods proposed in FIGS. 1 to 9. Layers of radio interface protocol may be implemented by the processor. The memory 1022 is connected to the processor 1021 and stores various types of information for driving the processor 1021. The RF module 1023 is connected to the processor 1021 and transmits and/or receives radio signals.

The memories 1012 and 1022 may be inside or outside the processors 1011 and 1021 and may be connected to the processors 1011 and 1021 through various well-known means.

Further, the base station 1010 and/or the UE 1020 may have a single antenna or multiple antennas.

Figure 11:
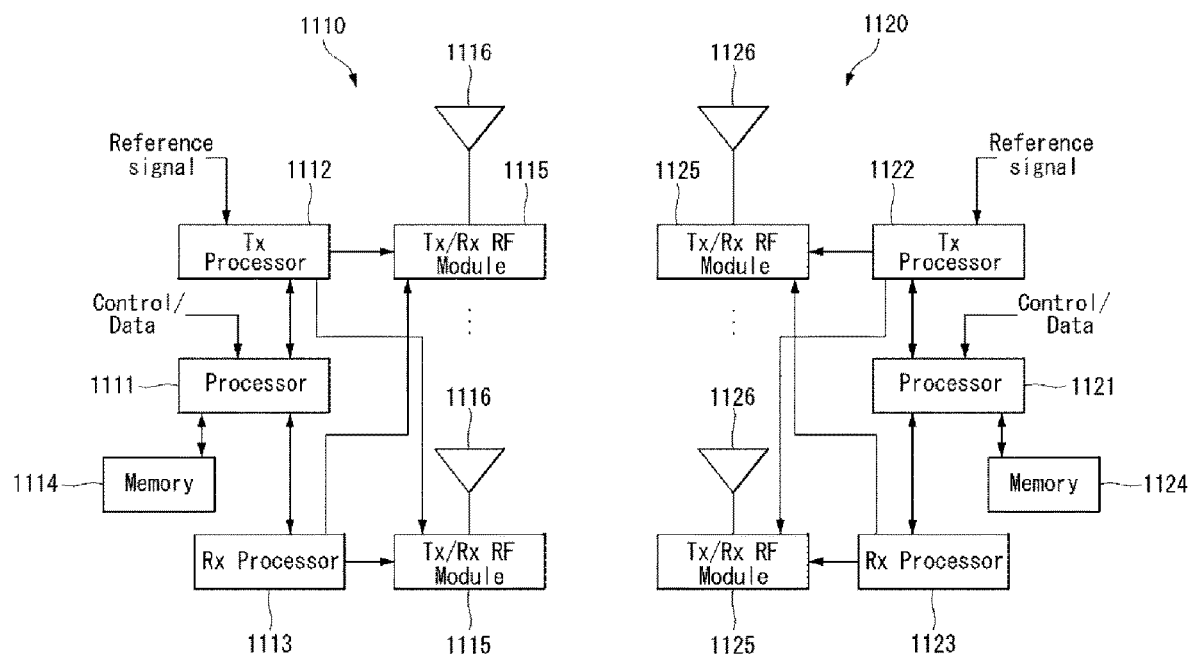
FIG. 11 illustrates another example of a block configuration diagram of a wireless communication device to which methods proposed by the present specification are applicable.

FIG. 11 illustrates another example of a block configuration diagram of a wireless communication device to which methods proposed by the present specification are applicable.

Referring to FIG. 11, a wireless communication system includes a base station 1110 and multiple UEs 1120 positioned in a region of the base station. The base station 1110 may be represented by a transmitter, and the UE 1120 may be represented by a receiver, or vice versa. The base station 1110 and the UE 1120 respectively include processors 1111 and 1121, memories 1114 and 1124, one or more Tx/Rx RF modules 1115 and 1125, Tx processors 1112 and 1122, Rx processors 1113 and 1123, and antennas 1116 and 1126. The processors implement functions, processes, and/or methods mentioned above. More specifically, in DL (communication from the base station to the UE), an upper layer packet from a core network is provided to the processor 1111. The processor implements functionality of the L2 layer. In the DL, the processor provides multiplexing between a logical channel and a transport channel and radio resource allocation to the UE 1120 and is also responsible for signaling to the UE 1120. The transmit (Tx) processor 1112 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1116 via a separate Tx/Rx module (or transceiver 1115). Each Tx/Rx module may modulate an RF carrier with a respective spatial stream for transmission. At the UE, each Tx/Rx module (or transceiver 1125) receives a signal through the respective antenna 1126 of each Tx/Rx module. Each Tx/Rx module recovers information modulated onto an RF carrier and provides the information to the receive (Rx) processor 1123. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and deinterleaved to recover data and control signals that were originally transmitted by the base station on the physical channel. The corresponding data and control signals are provided to the processor 1121.

UL (communication from the UE to the base station) is processed at the base station 1110 in a manner similar to the description associated with a receiver function at the UE 1120. Each Tx/Rx module 1125 receives a signal through the respective antenna 1126. Each Tx/Rx module provides an RF carrier and information to the Rx processor 1123. The processor 1121 may be associated with the memory 1124 that stores a program code and data. The memory may be referred to as a computer readable medium.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

While the present invention has been described and illustrated herein with reference to the preferred embodiments thereof, it will be apparent to those skilled in the art that various modifications and variations can be made therein without departing from the spirit and scope of the present invention. Thus, it is intended that the present invention covers the modifications and variations of this invention that come within the scope of the appended claims and their equivalents.

Although the present invention has been described focusing on examples applying to the 3GPP LTE/LTE-A/NR system, it can be applied to various wireless communication systems other than the 3GPP LTE/LTE-A/NR system.

What is claimed is:

1. A method of receiving, by a base station (BS), uplink control information (UCI) on a physical uplink control channel (PUCCH) in a wireless communication system, the method comprising:

transmitting, to a user equipment (UE), configuration information related to the PUCCH; and receiving, from the UE, the UCI on the PUCCH based on the configuration information, wherein the UCI includes channel state information (CSI) including at least one of a first part or a second part,
wherein the UCI is rate matched,
wherein a first rate matching output length for the first part of the CSI included in the UCI is determined as a smaller of (i) a first value and (ii) a second value,
wherein the first value is related to a total rate matching output length for transmitting the UCI on the PUCCH,
wherein the second value is determined based on dividing a first parameter by each of a second parameter and a third parameter, and
wherein the first parameter is related to a size of the first part of the CSI, the second parameter represents a configured maximum coding rate for the PUCCH, and the third parameter represents a modulation order for the PUCCH.

2. The method of claim 1, wherein the first rate matching output length for the first part of the CSI is determined based on (⌈first parameter÷second parameter÷third parameter⌉× third parameter), and
wherein ⌈·⌉ is a ceiling function.

3. The method of claim 2, wherein the first rate matching output length is determined by min(first value, ⌈first parameter÷second parameter÷third parameter⌉×third parameter).

4. The method of claim 1, wherein the size of the first part of the CSI is a size of a payload of the first part of the CSI.

5. The method of claim 1, wherein the configuration information includes (i) information regarding a number of symbols of the PUCCH for transmitting the UCI and (ii) information regarding a number of resource blocks of the PUCCH.

6. The method of claim 5,
wherein the first value is determined based on a product $N_{sym}^{PUCCH} \times N_{RB}^{PUCCH}$, and
wherein (i) the $N_{sym}^{PUCCH}$ is the number of symbols of the PUCCH for transmitting the UCI and (ii) the $N_{RB}^{PUCCH}$ is the number of resource blocks of the PUCCH.

7. The method of claim 1, wherein the UCI comprises (i) the CSI and (ii) at least one of a Scheduling Request (SR) or Hybrid Automatic Repeat Request Acknowledgment (HARQ-ACK) information.

8. The method of claim 1,
wherein the UCI on the PUCCH is received further using a second rate matching output length for the second part of the CSI of the UCI.

9. The method of claim 1, further comprising:
transmitting, to the UE through Radio Resource Control (RRC) signaling, the second parameter that represents the configured maximum coding rate for the PUCCH.

10. The method of claim 1, wherein the CSI is arranged, based on CSI priority values, in the first part and the second part.

11. A base station (BS) configured to receive uplink control information (UCI) on a physical uplink control channel (PUCCH) in a wireless communication system, the BS comprising:
a transceiver;
at least one processor; and
at least one computer memory operably connectable to the at least one processor and storing instructions that, when executed by the at least one processor, perform operations comprising:
transmitting, to a user equipment (UE), configuration information related to the PUCCH; and
receiving, from the UE, the UCI on the PUCCH based on the configuration information,
wherein the UCI includes channel state information (CSI) including at least one of a first part or a second part,
wherein the UCI is rate matched,
wherein a first rate matching output length for the first part of the CSI included in the UCI is determined as a smaller of (i) a first value and (ii) a second value,
wherein the first value is related to a total rate matching output length for transmitting the UCI on the PUCCH,
wherein the second value is determined based on dividing a first parameter by each of a second parameter and a third parameter, and
wherein the first parameter is related to a size of the first part of the CSI, the second parameter represents a configured maximum coding rate for the PUCCH, and the third parameter represents a modulation order for the PUCCH.

12. The BS of claim 11, wherein the first rate matching output length for the first part of the CSI is determined based on (⌈first parameter÷second parameter÷third parameter⌉× third parameter), and
wherein ⌈·⌉ is a ceiling function.

13. The BS of claim 12, wherein the first rate matching output length is determined by min(first value, ⌈first parameter÷second parameter÷third parameter⌉×third parameter).

14. The BS of claim 11, wherein the configuration information includes (i) information regarding a number of symbols of the PUCCH for transmitting the UCI and (ii) information regarding a number of resource blocks of the PUCCH.

15. The BS of claim 14, wherein the first value is determined based on a product $N_{sym}^{PUCCH} \times N_{RB}^{PUCCH}$, and
wherein (i) the $N_{sym}^{PUCCH}$ is the number of symbols of the PUCCH for transmitting the UCI and (ii) the $N_{RB}^{PUCCH}$ is the number of resource blocks of the PUCCH.

16. The BS of claim 11, wherein the UCI on the PUCCH is received further using a second rate matching output length for the second part of the CSI of the UCI.

* * * * *